United States Patent
Grahl et al.

(10) Patent No.: US 6,857,218 B1
(45) Date of Patent: Feb. 22, 2005

(54) ICE FISHING TIP-UP DEVICE

(75) Inventors: Paul Grahl, Eden, WI (US); Kenneth L. Grahl, Fon-Du Lac, WI (US); Rick D. Dreikosen, Campbellsport, WI (US)

(73) Assignee: HT Enterprises, Inc., Campbellsport, WI (US)

( * ) Notice: Subject to any disclaimer, the term of this patent is extended or adjusted under 35 U.S.C. 154(b) by 0 days.

(21) Appl. No.: 10/628,250

(22) Filed: Jul. 29, 2003

(51) Int. Cl.[7] .............................................. A01K 93/00
(52) U.S. Cl. ........................................................ 43/17
(58) Field of Search ............................ 43/17, 4, 15, 16

(56) References Cited

U.S. PATENT DOCUMENTS

| | | | | |
|---|---|---|---|---|
| 2,786,294 A | * | 3/1957 | Whitacre ........................ | 43/17 |
| 3,745,689 A | * | 7/1973 | Williams ........................ | 43/17 |
| 4,285,154 A | | 8/1981 | Grahl | |
| 4,310,983 A | * | 1/1982 | Irvin et al. ..................... | 43/17 |
| 4,845,878 A | * | 7/1989 | Hackel .......................... | 43/17 |
| 4,953,317 A | * | 9/1990 | Ruchel .......................... | 43/17 |
| 5,044,108 A | * | 9/1991 | Rinehart ........................ | 43/17 |
| 5,067,269 A | * | 11/1991 | Eppley et al. ................. | 43/17 |
| 5,074,072 A | * | 12/1991 | Serocki et al. ................ | 43/17 |
| 5,097,618 A | * | 3/1992 | Stoffel .......................... | 43/17 |
| 5,101,591 A | * | 4/1992 | Frazier et al. ................. | 43/17 |
| 5,157,855 A | * | 10/1992 | Schmidt et al. ............... | 43/17 |
| 5,235,773 A | * | 8/1993 | Rinehart ........................ | 43/17 |

\* cited by examiner

*Primary Examiner*—Kurt Rowan
(74) *Attorney, Agent, or Firm*—Jacobson Holman PLLC (57) ABSTRACT

An improved tip-up flag device having a generally disk-shaped housing with a plurality of raised portions on the upper surface thereof which are substantially hollow to create corresponding cavities on the underside. A retaining and releasing assembly, connected to a reel spool assembly, is rotatably mounted in the housing for movement between a retracted position and an in-use position. When retracted, the reel spool assembly fits to be at least flush within one of the cavities. Other of the raised portions form a handle, an integrated tackle compartment and a flag securing post. The height, size and positioning of each of these raised portions is such that multiple devices may be evenly stacked and held against one another for convenient storage and transport.

20 Claims, 7 Drawing Sheets

ICE FISHING TIP-UP DEVICE

BACKGROUND OF THE INVENTION

1. Field of the Invention

The present invention is related to the field of ice fishing and, more particularly, to an improved tip-up flag device having adjustable trip settings and improved pivot mechanism, as well as improved compactness, handling and performance characteristics.

2. Description of the Related Art

To increase the enjoyability and effectiveness of time spent ice fishing, various signaling devices have been used to visually indicate to the ice fisherman when a fish has taken a particular line. A retracted signal device, such as a signal flag, has been used extensively, being held in a non-signaling position by various structural arrangements and then being released to a signaling position when a fish has been hooked. The fisherman, who may be some distance away, is then alerted of the need to tend the line without wasting time sitting next to the hole in the ice, waiting for a fish.

As the fisherman may have many fishing lines baited at any given time, and dispersed over a broad area, false fish-on-the-hook "signaling" alarms caused by inadequate trip settings are undesirable, both from the standpoint of the effort required to tend and reset the signal device, and due to the possibility that the valid activation of another signaling flag device may be missed during the resetting interval.

In addition to the dynamics of the fishing process itself, the deployment of a plurality of tip-up flag devices can be awkward as the devices are somewhat bulky and typically irregular in shape. Once they are outfitted with line and hooks, they are increasingly cumbersome and prone to becoming tangled with one another.

SUMMARY OF THE INVENTION

In view of the foregoing, one object of the present invention is to provide a tip-up flag device for ice fishing having fully adjustable trip settings to best suit a variety of different fishing situations.

Another object of the present invention is to provide a tip-up flag device that partially nests and is self-stacking so as to overcome the difficulties of transporting a plurality of such devices to the ice fishing location and facilitate shipping and storage.

Yet another object of the present invention is to provide a tip-up flag device for ice fishing that is equipped with a built-in hook holder to prevent line tangles.

A further object of the present invention is to provide a tip-up flag device with an integrated handle to facilitate handling of the device including the removal thereof from the ice.

Still another object of the present invention is to provide a tip-up flag device that is compact in size and sturdy in construction so as to effectively seal a drilled ice hole and prevent the hole from freezing.

Yet another object of the present invention is to provide a tip-up flag device for ice fishing with a built-in multi-compartment tackle box for organizing and storing a plurality of tackle accessories.

A still further object of the present invention is to provide a tip-up flag device which is simple in construction, easy to use, effective and durable, and can be easily manufactured for using readily available components.

In accordance with these and other objects, the present invention is directed to a tip-up device having a generally disk-shaped housing on which are mounted a flag assembly and a retaining and releasing assembly connected to a reel spool assembly. The housing includes a plurality of raised portions on the upper surface thereof which create corresponding cavities on the underside, including a spool cavity. The retaining and releasing assembly is rotatably mounted in the frame for movement between a retracted position and an in-use position. The reel spool assembly, when retracted, fits fully within the spool cavity so that no component extends below the lower surface of the housing. Other of the raised portions form a handle assembly, an integrated tackle compartment and a flag securing post. The height and partial nesting of each of the raised portions is such that multiple devices may be stacked and held level against one another for convenient storage and transport.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Although only one preferred embodiment of the invention is explained in detail, it is to be understood that the embodiment is given by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

Referring now specifically to the drawings of FIGS. 1-7, a tip-up flag device for ice fishing in accordance with the present invention is generally designated by the reference numeral 10. The device 10 includes a generally disk-shaped housing or frame generally designated by reference numeral 12 on which are mounted a flag assembly generally designated by reference numeral 14 and a retaining and releasing assembly generally designated by reference numeral 16. A reel spool assembly generally designated by reference numeral 18 is mounted on one end of the retaining and releasing assembly 16.

Figure 1:
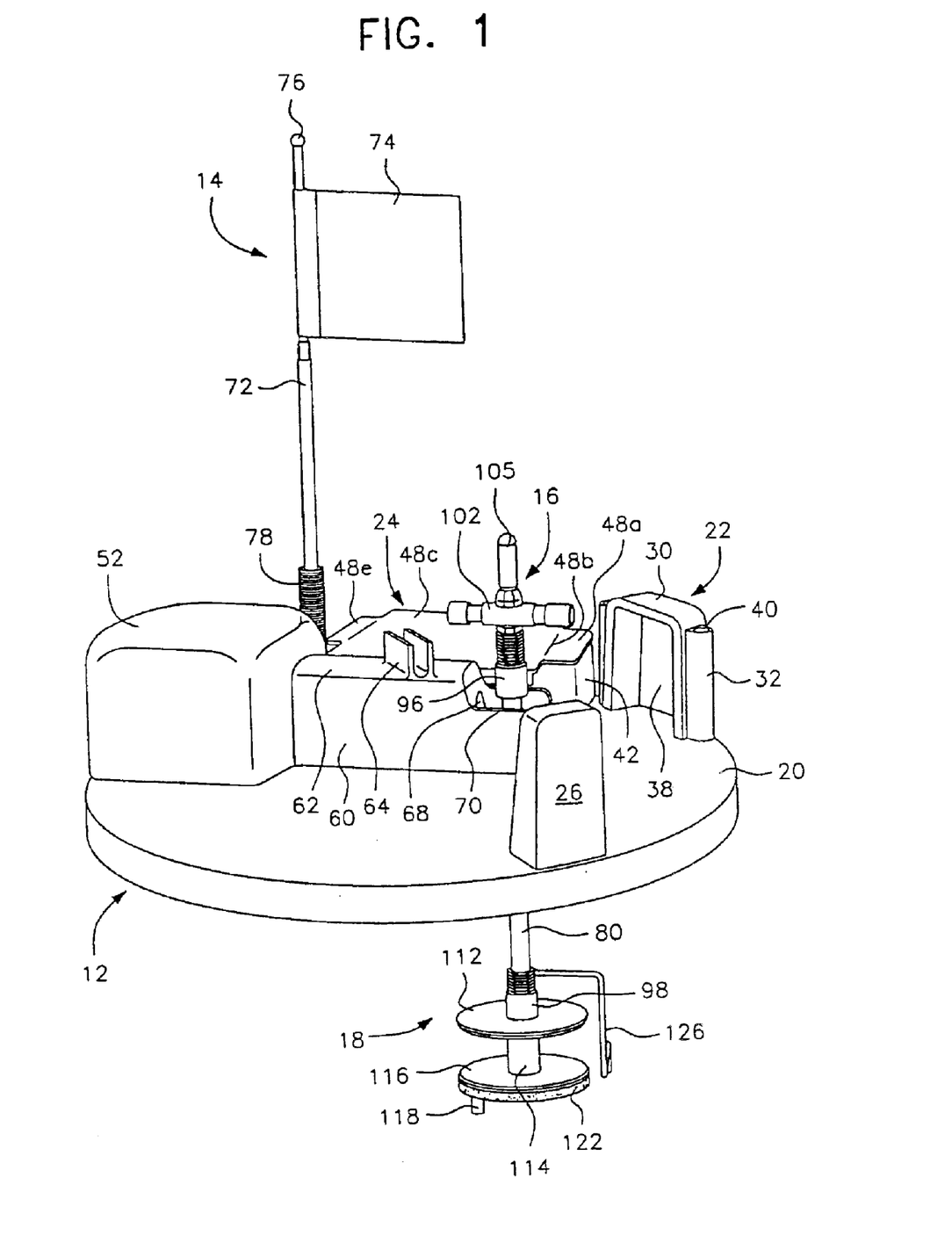
FIG. 1 is a perspective view of a tip-up flag device for ice fishing in accordance with the present invention, illustrating the device in use with the flag released to the upright, signaling position.
Figure 2:
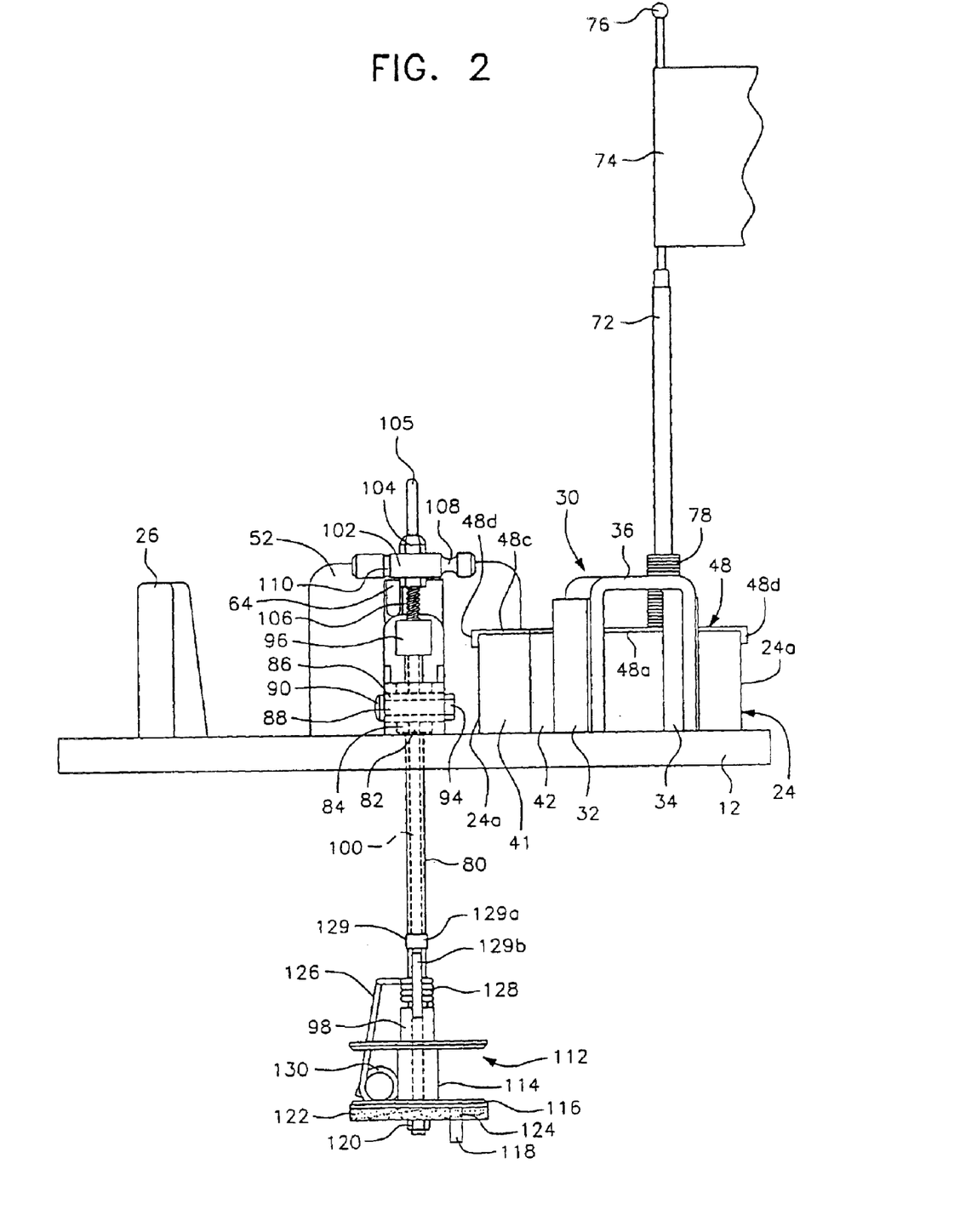
FIG. 2 is side view of the device as shown in FIG. 1.

As best shown in FIGS. 1 and 2, the housing 12, which is preferably made of molded plastic, includes on its generally flat upper surface 20 several upwardly protruding portions including a handle assembly generally designated by reference numeral 22, an integrated tackle compartment generally designated by reference numeral 24, a flag securing post 26 and a flag-mounting peg 28.

The handle assembly 22 provides a convenient way to pick up and hold the device, and includes a handle 30. The handle 30 has two arms 34 upwardly extending from top surface 20 of the housing 12 and joined at their distal ends by a crossbar 36 to create an opening 38. The crossbar 36 and opening 38 allow the fisherman to obtain an excellent grip on the device 10 as one's fingers can extend through the opening, even when gloves are worn. A rope, wire or other fastening device may also pass through the opening 38 and tied off on crossbar 36 for retrieval of the device 10 from the ice, securing of the device to another object, etc.

On either side of the handle 30 is preferably an integrally formed light-stick holder 32 with elongated central channels 40 into which commercially available light-sticks (not shown) may be readily inserted. The assembly 22 could also be constructed with a single light-stick holder 32, if desired.

The integrated tackle compartment 24 has an upstanding generally rectangular body portion 41 molded therewith into the upper surface 20 of the housing 12. The body portion 41 includes sidewalls 24a, end wall 24b and a lid foundation 42 formed into the fourth wall. Four generally hollow corner posts 44 extend through the housing 12 and body portion 41; two of the corner posts 44a extend through the lid foundation 42, while the other two posts 44b extend through those corners of the body portion 41 located distally from the lid foundation 42. The compartment 24 is preferably molded to include multiple sub-compartments 46a, 46b, 46c, formed by upstanding dividers 46d, as shown by the dotted lines in FIG. 3. Alternatively, the bottom of the compartment 24 could be molded with grooves into which removable divider sections (not shown) could be inserted by the user as desired for customized sizing of the sub-compartments 46, or to allow for no sub-compartments.

The tackle compartment 24 is covered with a lid 48 that is hingedly connected to the lid foundation 42 by a lid retaining portion 48a. The lid is preferably made of molded plastic and has a folding line 48b of reduced material thickness, separating the main lid portion 48c from the lid retaining portion 48a, along which the main portion 48c of the lid 48 may be folded upwardly for opening the compartment 24. The lid 48 further includes a downwardly extending lip 48d partially overhanging the side walls 24a and end wall 24b of the compartment to provide better protection of the contents therein, and an outwardly extending flange 48e that can be grasped easily to facilitate opening of the lid. The underside of the flange 48e is preferably provided with at least one raised rib 48f to enhance gripping of the flange by the user when opening the lid. The underside of the main lid portion 48c is also preferably provided with two projections (not shown) which have a snap fit within hollow corner posts 44b to secure the lid in the closed position.

The flag securing post 26 includes a radially inwardly facing side opening aperture 50 therein, and is spaced from the handle assembly 22 and flag-mounting peg 28 around the circumference of the upper surface 20 of the frame 12. The handle assembly 22, flag securing post 26 and lid foundation 42 are preferably at least partly hollow to reduce the weight and amount of material used in manufacturing the device 10.

Figure 3:
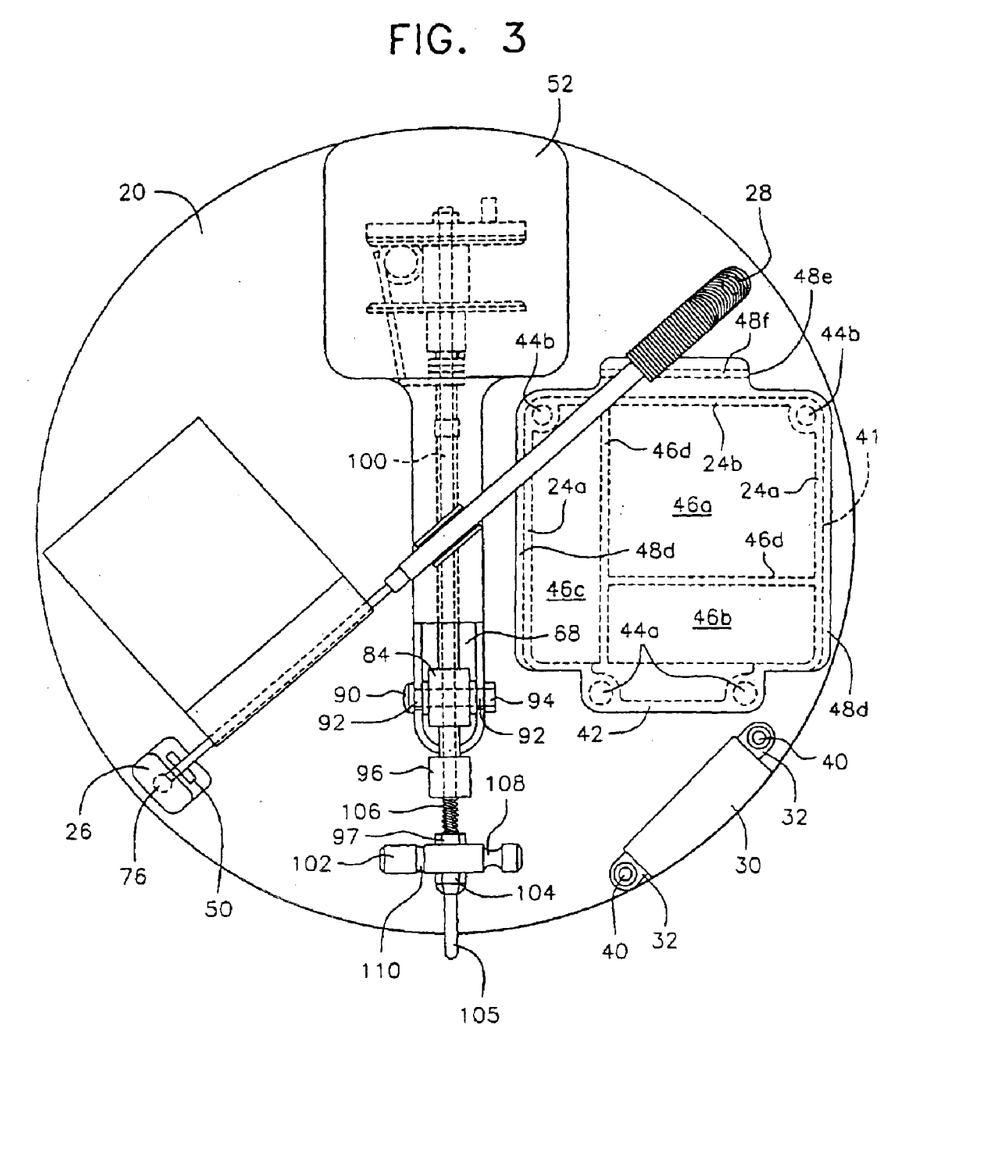
FIG. 3 is a top view of the device of FIG. 1, but shown with the flag assembly in the "stored" position, and the retaining and releasing assembly in the retracted position.
Figure 4:
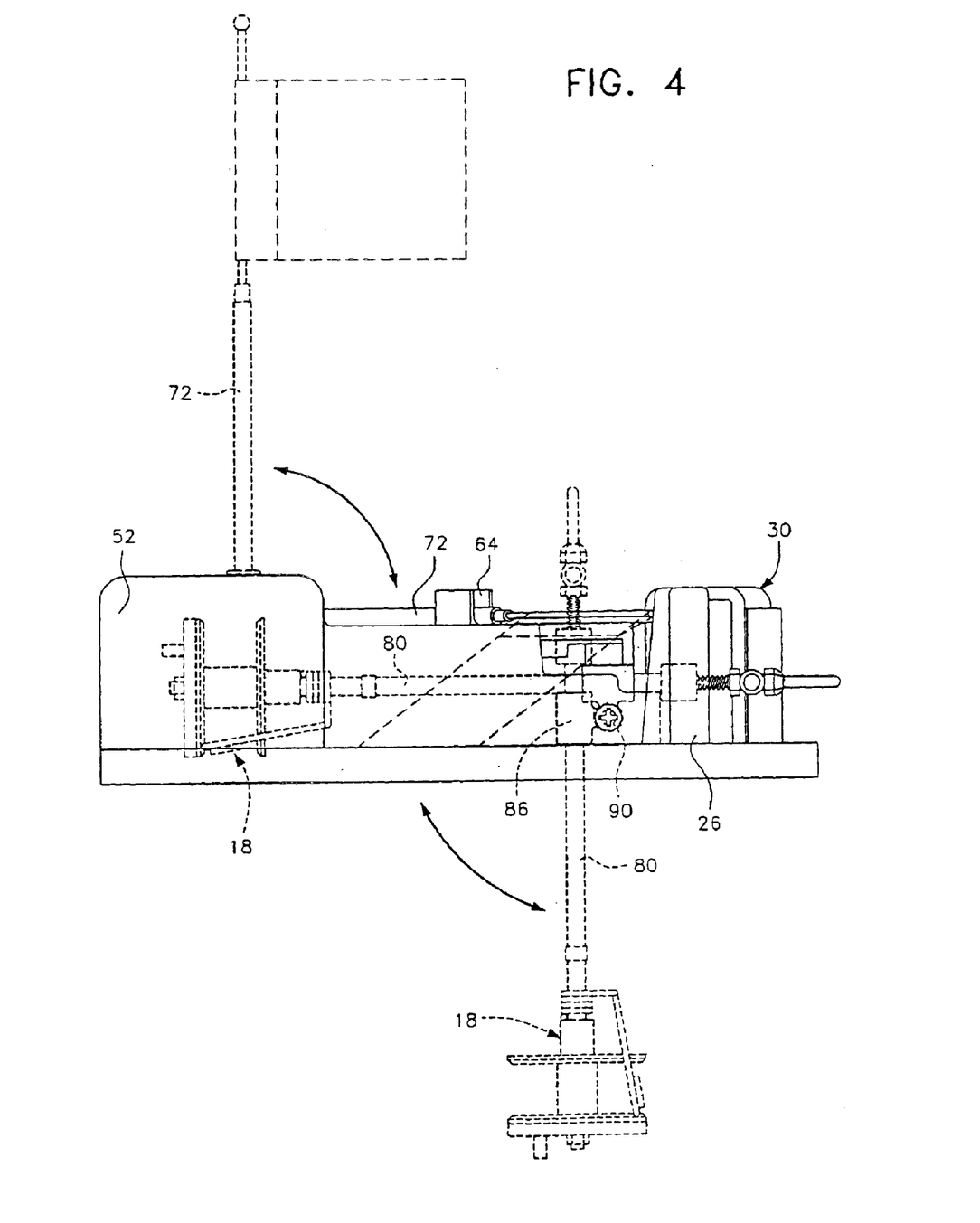
FIG. 4 is a side view of the tip-up flag device as positioned in FIG. 3, with the alternative signaling and in-use positions of the flag assembly and the retaining and releasing assembly, respectively, shown in dotted lines.
Figure 5:
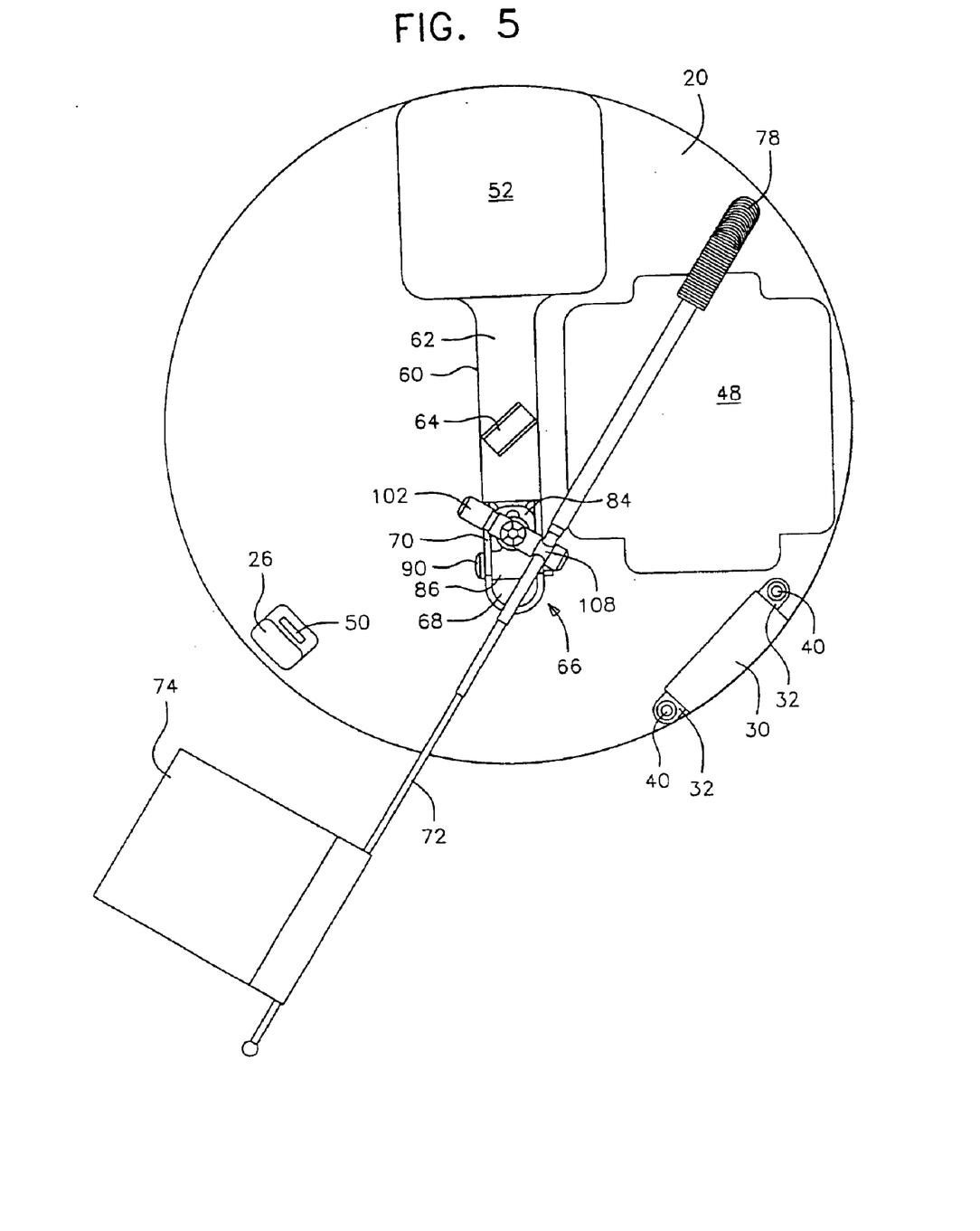
FIG. 5 is a top view of the device of FIG. 1, but shown with the flag assembly in the "set" position.
Figure 6:
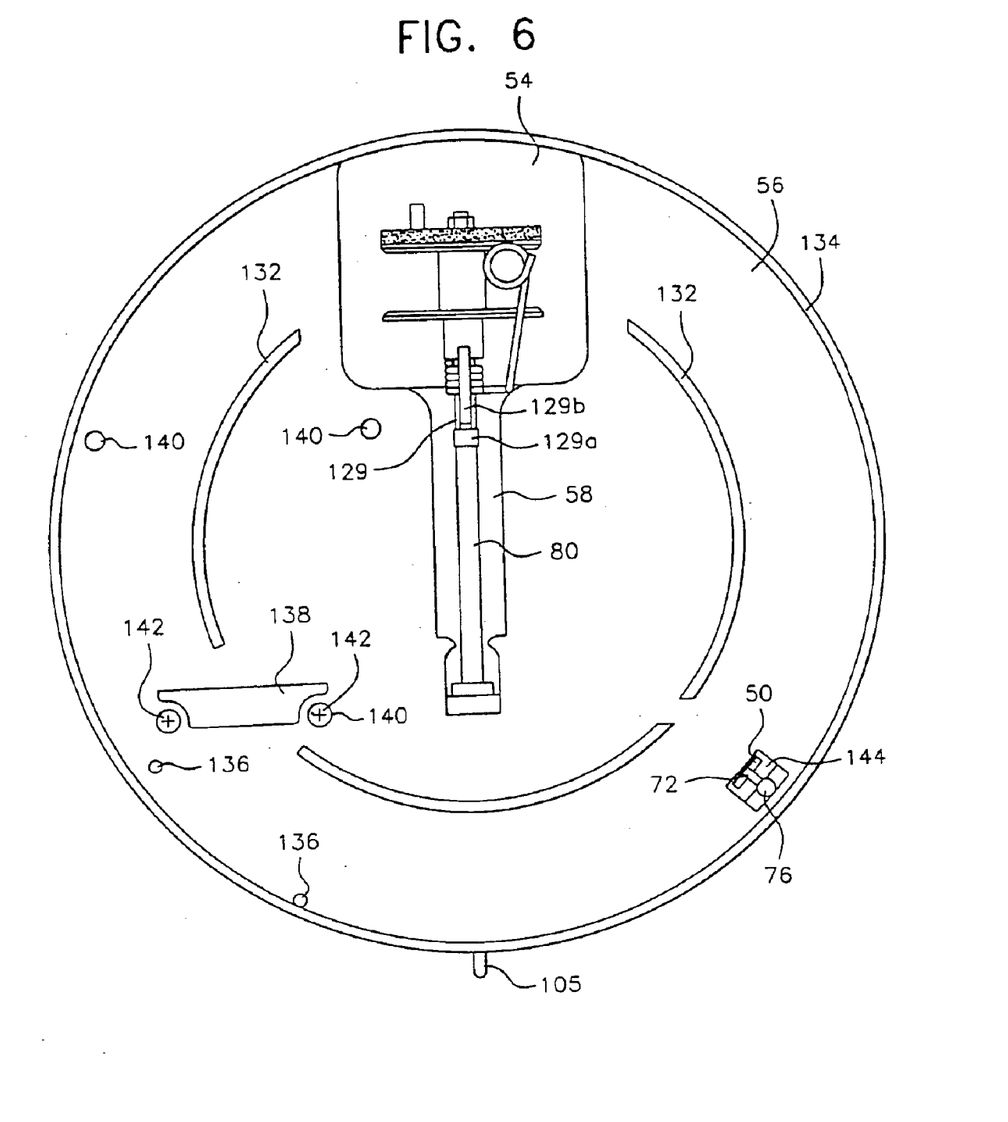
FIG. 6 is a bottom view of the tip-up flag device in the "stored" position as also shown in FIG. 3.

A hollow spool protrusion 52 on the upper surface 20 of the frame 12 forms thereunder a spool cavity 54 that opens to the underside 56 of the frame 12 for retention of the reel spool assembly 18 when such assembly is in its retracted position, as shown in FIGS. 3 and 4. The outer wall 53 of spool protrusion 52 is preferably curved and coincides with the outer circumference of housing 12, as shown in FIGS. 5 and 6. Opening into the spool cavity 54 is a generally tubular cavity 58 formed by an elongated raised portion 60 adjoining the hollow spool protrusion 52. Formed integrally with the upper surface 62 of the elongated raised portion 60 is a flag-wire guiding element 64 for use when securing the flag assembly 14 in the storing position during storage or transport.

The end of the elongated raised portion 60 remote from the spool protrusion 52, generally designated by reference numeral 66 (see FIG. 5), has an opening 68 through the upper surface 62 forming associated truncated side portions 70 that accommodate passage therethrough of the retaining and releasing assembly 16, whether in the in-use or retracted positions.

The flag assembly 14 includes an elongated flag mast or wire 72 which preferably has a telescoping construction for adjustable height, with a flag 74 adjacent an upwardly extending end 76 thereof. The flag wire 72 is secured to the housing 12 through a spring 78 which allows the flag wire and flag, when the device is in use, to move between a "signaling" position shown in FIGS. 1 and 2, and a "set" position shown in FIG. 5, as well as to accommodate the storage position shown in FIGS. 3 and 4.

The flag 74 is preferably constructed of a natural material having a brightly colored plastic coating on both sides for increased visibility in the snow. The material is glued or otherwise affixed to the wire to keep the flag from slipping. The flag 74 is preferably mounted approximately one-half inch from the end 76 of the wire 72 so that the end 76 can be placed within the side-opening aperture 50 in the flag securing post 26 when in the stored position illustrated in FIG. 3. The lower end of the wire 72 is embedded in a nylon sleeve (not shown) which is disposed in spaced relation to the flag-mounting peg 28. The spring 78 surrounds and grips the peg 28 and the sleeve to effect a resilient connection therewith that enables a swinging motion of the flag wire. The spring 78 is preferably a closely wound spring which provides enough strength to lift the flag or even signal lights, or the like, placed thereon, but it is soft enough to allow the flag to rise gently, thereby eliminating most vibration to the housing 12.

The retaining and releasing assembly 16 and the reel spool assembly 18 include an elongated rod, preferably in the form of a tube 80, which extends through an axial bore 82 in an offset tube portion 86 of a center mounting element 84. The center mounting element 84 has a pivot bore 88 therein that is substantially perpendicular to the axial bore 82. The center mounting element 84 is rotatably secured to the truncated side portions 70 of the elongated raised portion 60 by a fastening element 90 that passes through the pivot bore 88 of the center mounting element 84 and corresponding apertures 92 in the side portions 70. The fastening element 90 may be a bolt secured with a nut 94 as shown in FIG. 3.

The upper end of the tube 80 is provided with a top tube cap 96 and the lower end of the tube 80 is provided with a bottom tube cap 98, both of which are permanently affixed to the respective ends of the tube 80. Freely rotatable in the tube 80 is a drive shaft 100 that has ends extending longitudinally above and below the ends of the tube 80. A transversely extending trip shaft 102 is rigidly mounted adjacent the upper end of the drive shaft 100 and is held in place between nut 97 and top cap 104 threaded on the threaded upper end of the drive shaft 100. A flexible sleeve cap 105 covers the top of the drive shaft 100 and can be easily grasped between the thumb and forefinger to spin the shaft 100.

A cushioning support spring 106 encircles the upper end of the drive shaft 100 and is interposed between the upper end of the top tube cap 96 and the bottom side of nut 97 so that the drive shaft 100 can move downwardly slightly in relation to the tube 80 by compressing the cushioning spring 106. The cushioning spring 106 provides a shock-absorbing function which prevents the fish from feeling any movement in the trip shaft 102 and any rising impact then the flag 74 goes from the "set" position to the "signaling" position. Alternatively, the trip shaft 102 can be threaded onto the upper end of the drive shaft 100 and locked on with either top cap 104 or nut 97 or both.

Further, the support spring 0.106 when slightly compressed allows the end of sleeve cap 105 to move within the cylinder defined by the outer periphery of housing 12. Hence, when the flag assembly 14 and the reel spool assembly 18 are both in a storage position as shown in FIG. 3, all components of the device can be made to fit within a cylinder defined by the outer periphery of the housing 12, thus providing the compactness of device 10 for storage and transport.

The trip shaft 102 is formed with two grooves 108, 110, one on either side of the drive shaft 100. The grooves 108, 110 have differing depths to provide adjustable trip settings. When the flag is in the "set" position shown in FIG. 5, the flag wire 72 is secured under the trip shaft within one of the grooves. Depending upon whether the flag wire 72 is secured under the deeper groove 108 or the shallower groove 110, a different amount of pull on the line will be necessary to initiate release of the flag assembly 14 from the "set" position to the "signaling" position. Generally, with the flag wire 72 in the shallower groove 110, a lighter pull on the line will release the flag 74 and signal the fisherman that a fish is on the line than when the flag wire is secured under the deeper groove 108. In those situations when larger fish are sought, or during adverse weather conditions such as strong winds, fewer false "signaling" indications can be obtained through placement of the flag wire within the deeper groove 108 in the trip shaft 102.

In addition to variation in the trip settings afforded by the two grooves in the trip shaft 102, further trip setting adjustment is provided by the manner in which the line is wound on the reel, in combination with which side of the trip shaft is used to hold the flag wire in the "set" position. With the line wound in one direction, placement of the flag wire under one side of the trip shaft 102 will require the shaft to slide up the flag wire, in turn pushing the flag wire down and having a drag effect. Conversely, if the flag wire is placed under the other side of the trip shaft, assuming the same line winding direction, the shaft will slide down the flag wire, offering virtually no drag at all. When the line is wound in the opposite direction, comparable variations are possible, but with a different groove setting. Therefore, by winding the line so that use of the deep groove 108 coincides with the requirement that the trip shaft 102 slide up the flag wire 72, a heaviest trip setting can be obtained, while winding the line to combine use of the shallow groove 110 with movement of the trip shaft down the flag wire will afford the lightest trip setting.

The reel spool assembly 18 includes a reel or spool 112 in communication with the drive shaft 100. The reel 112 is preferably constructed of plastic material with the fishing line (not shown) being wound on a cylindrical center piece 114 thereof as is known in the art. The lower flange 116 of the reel 122 has a depending offset handle 118 to facilitate rotation thereof. The reel is retained in place on the drive shaft 100 by press fitting the reel onto the drive shaft and utilizing a lock washer (not shown) and a bottom end cap or nut 120 engaged with the lower end of the shaft 100. The reel is preferably able to hold up to 200 feet of line.

Engaged with the lower flange 116 is a disc-shaped rubber hook keeper 122 to which the hook, at the end of the line wound on the center piece 114, may be secured. The hook keeper 122 provides a convenient and effective way of keeping the line tangle free and preventing the hook from engaging with other tip-up flag devices in a storage or transport situation. While in the preferred embodiment the hook keeper 122 is made of a rubber or other elastomeric material, other suitable materials could also be used. The keeper 122 has an aperture 124 through which the handle 118 on the reel extends.

A line guide 126 preferably made of wire has a plurality of spring convolutions 128 which are loosely mounted on the tube 80 so that the line guide 126 can swing freely in relation to the tube 80 and reel 112. This free-swinging capability may be partially impeded by a custom line guide lock or friction device 129 having a tube-clasping portion 129a and an elongated line-guide clipping portion 129b that are comparable in construction to a pen clip. The tube-clasping portion 129a is placed in gripping relationship around the tube 80 in the same way that a pen clip is held on a ballpoint pen. By sliding the tube-clasping portion 129a to a position adjacent the spring convolutions 128 of the line guide 126, the elongated clipping portion 129b extends over the spring convolutions, with the end of the clipping portion either resting on the tube 80 or on the bottom tube cap 98. In this position, the line guide is still free to rotate, but incurs some resistance due to friction between the tube-clasping portion 129a and the tube 80, as the portion of the line guide extending outwardly from the tube contacts the clipping portion 129b and must therefore rotate the pen-type clip 129 in order to pass around the tube. This arrangement of the line guide lock 129 over the line guide is advantageous when fishing for larger fish with live bait, such as a minnow. While not exerting sufficient force to trip the retaining and releasing assembly, the swimming minnow can nonetheless continue circling beneath the device and pull out an excessive amount of line from the spool if the line guide spins too easily.

The lower end of the line guide 126 is in the form of a loop 130 in alignment with the reel 112, with the loop 130 providing an easy lock feature for the line by virtue of the wire loop 130 being bent in a 1¼ circle with the end of the wire left a short distance from the wire coming to the reel. This allows the fisherman to place the fishing line easily into the line guide, yet rendering it difficult for the line to slip out of the line guide when placed in the water. When the fisherman is ready to leave the fishing area, he or she can easily remove the line from the line guide by hand for a more rapid removal of the line from the water.

In accordance with the present invention, the flag assembly 14 is placed in the "set" position by holding the flag wire 72 under one of the grooves in the trip shaft 102, as illustrated by the wire 72 under the deeper groove 108 in FIG. 5, with the flag wire in an at least partly extended telescoping position. Then, when the line is pulled, such as by a fish taking the bait or striking the hook, the reel 122 will be rotated, thus causing the trip shaft 102 to be rotated to release the flag assembly 14 to its upright signaling position.

As shown in FIGS. 3 and 4, when the device is to be stored, the retaining and releasing assembly 16 and the reel spool assembly 18 are rotated by center mounting element 84 on fastening element 90 to a generally horizontal position with the reel spool assembly 18 fitted within the spool cavity 54 and the tube 80 of the generally parallel with the upper surface 20 of the housing 12. The flag wire 72 is telescoped within itself to the lowest or nearly lowest height setting and folded downwardly to place the flag wire in the flag-wire guiding element 64 and position the end 76 of the wire 72 within the side-opening aperture 50 in the flag securing post 26. The length of the flag wire may then be advantageously extended somewhat to ensure the retention of the end 76 within the aperture 50.

FIG. 6 is a bottom view of the device 10, showing the reel spool assembly 18 fitted within the spool cavity 54. The underside 56 of the housing 12 is generally flat but may be provided with curved protrusions 132. These protrusions 132 have a height that is substantially equal with depending rim edge 134. The protrusions 132 and rim edge 134 facilitate firm placement of the device in snow, preventing lateral movement, as well as easier removal of the device 10 from the ice through the irregular nature of the underside surface.

Also visible on the underside 56 of the frame 12 are the hollow center portions 136 of the light-stick holders 32 and the hollow core 138 of the lid foundation 42, including hollow shafts 140 of corner posts 44a. Screws 142 are fitted within the hollow shafts 140 of corner posts 44a to secure the lid 48 to the integrated tackle compartment. The hollow center 144 of the flag securing post 26 is also shown, with the end 76 of the flag wire 72 inserted therein in the storage position.

Figure 7:
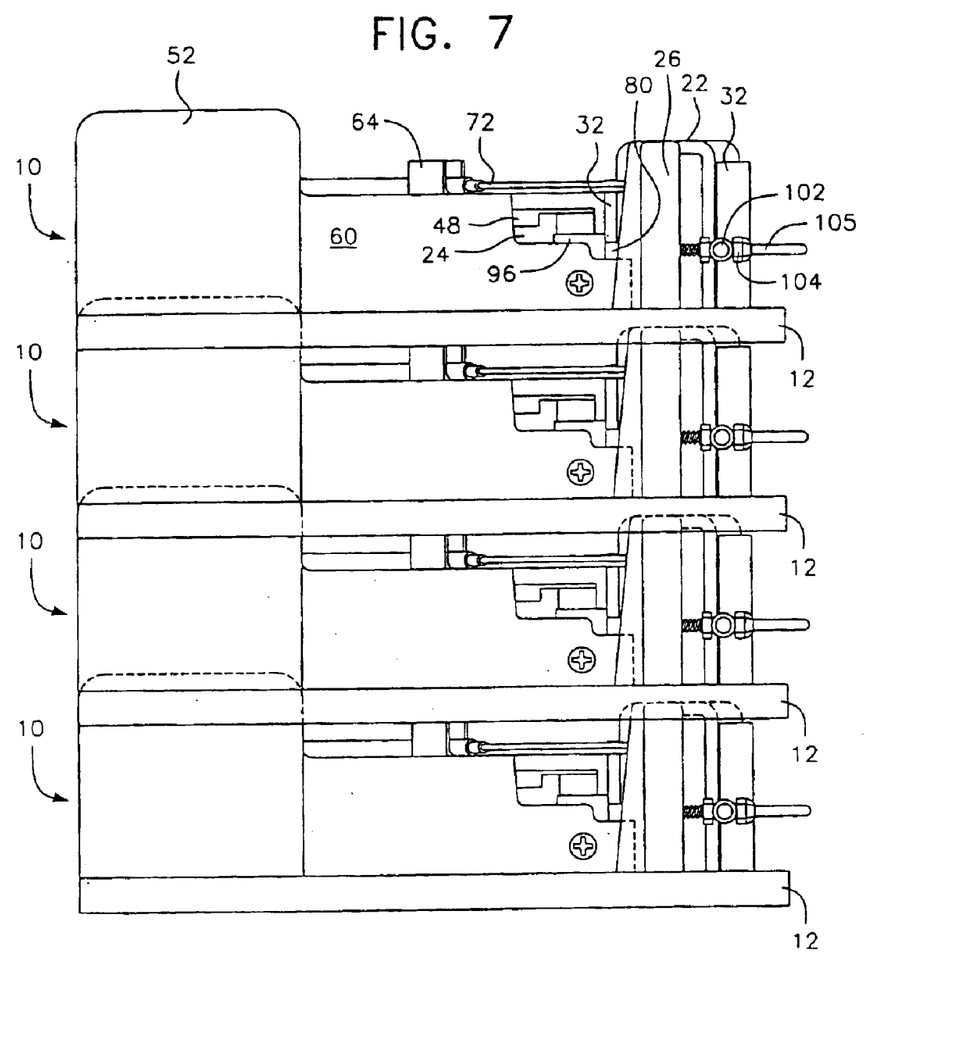
FIG. 7 is a side view of a plurality of tip-up flag devices stacked for compact storage or transport, in accordance with the present invention.

As shown in FIGS. 4 and 7, the height of the handle 30 and the top of the flag securing post 26 are approximately the same, with the height of the hollow spool protrusion slightly higher. Because the reel spool assembly 18 folds within the spool cavity 54 with the retaining and releasing assembly generally parallel with the upper surface 20 of the housing, a plurality of tip-up devices may be stacked and stored in a compact and convenient manner, as shown in FIG. 7. When so stacked, the upper surface of the hollow spool protrusion 52, nests slightly within the spool cavity 54 of the next tip-up device above it with the top of the handle 30 and the top of post 26 engaging the underside surface of the housing 12, thus helping to stabilize the stack. The spaced placement of the handle assembly 22 and the flag securing post 26 around the perimeter of the frame, relative to the hollow spool protrusion 52, provides a virtual platform to evenly support another tip-up device 10 stacked thereon.

The size of the frame also facilitates compact storage and transport capability. Specifically, according to a preferred embodiment, the housing 12 is sized to have a circumference slightly less than the inner diameter of a typical five or six gallon bucket so that a stack of the devices may be easily carried therein. According to the preferred size construction, five tip-up devices may be stacked, in the manner shown in FIG. 7, and stored tangle-free within a six gallon pail for easy transport.

To use the device, it is only necessary to rotate the retaining and releasing assembly 16 to the in-use position (perpendicular to the housing 12), set the line on the reel spool assembly 18 to a desired depth, place the flag wire 72 under the trip shaft 102 in one of the grooves 108 or 110, and position the device within the hole drilled in the ice. The placement of the device is made easy through use of the handle 30 which provides for a convenient way to hold and secure the device on the ice.

The tip-up device according to the present invention is made of durable, heavy-weight plastic designed to seal a drilled ice hole and prevent the hole from freezing. The tip-up does not float, but sinks, so that the presence of water on top of the supporting ice shelf does not make the tip-up unstable. More importantly, as an "underwater" tip-up, the present invention keeps the ice hole free of ice by remaining firmly against the supporting ice shelf and trapping the thermal action of the open water. As a result, the ice hole will remain open, i.e., unfrozen, even in subzero temperatures. At the same time, the plastic material from which the tip-up device is made remains lightweight and warm to the touch.

Should there be any concern regarding loss of the tip-up through sinking, a fastening element such as a rope, wire, etc. may be secured to the handle and held or fastened to another adjacent object on the ice surface, as already described.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A tip-up flag device comprising:
   a generally disc-shaped housing having a plurality of upwardly extending protrusions on a substantially flat upper surface thereof which include a hollow spool protrusion, a handle assembly and a flag securing post, said hollow spool protrusion forming a corresponding spool cavity in an underside of said housing;
   an upwardly extending signaling device mounted on said housing for movement between an upstanding signaling position, a set position adjacent to and generally parallel with said upper surface, and a storage position also adjacent to and generally parallel with said upper surface when engaged by said flag securing post;
   a retaining and releasing assembly rotatably supported on said housing for releasably retaining said signaling device in said set position, said retaining assembly including a trip shaft having at least two grooves therein of different depths, said signaling device in said set position being held under said trip shaft and within one of the said grooves; and
   a reel spool assembly connected to said retaining and releasing assembly by a tubular member so as to rotate in relation therewith, said reel spool assembly having a retracted position in which said tubular member is generally parallel with said upper surface and said reel spool assembly fits within said spool cavity so as to be at least flush with said underside, and an in-use position in which the tubular member is generally perpendicular to said upper surface and said trip shaft is positioned so as to retain said signaling device in said set position.

2. The device as set forth in claim 1, wherein said handle assembly includes two arms upwardly extending from said upper surface of the housing and joined at ends distal from said frame by a crossbar so as to create an opening for lifting and holding said device.

3. The device as set forth in claim 2, wherein each arm has a light-stick holder formed integrally therewith.

4. The device as set forth in claim 1, further comprising an integrated tackle compartment extending above said housing upper surface and having a plurality of sub-compartments formed therein and covered with a lid hingedly connected thereto.

5. The device as set forth in claim 4, wherein said lid includes a lid retaining portion and a main portion, said lid mounted using said lid retaining portion on a lid foundation formed integrally with said compartment on said housing, said main portion having a downwardly extending lip that partially overhangs side walls and an end wall of said compartment distal from said lid foundation.

6. The device as set forth in claim 5, wherein said lid is made of molded plastic and has a folding line of reduced material thickness separating said main portion and said lid retaining portion, along which folding line said main portion is folded upwardly for opening of said lid while said lid retaining portion remains secured to said lid foundation.

7. The device as set forth in claim 1, wherein the handle assembly includes at least one light stick holder integral therewith.

8. The device as set forth in claim 1, wherein said reel spool assembly includes a reel having a depending offset handle on a lower flange thereof and a generally disc-shaped rubber hook keeper positioned adjacent said lower flange, said offset handle extending through an aperture in said hook keeper.

9. The device as set forth in claim 1, further comprising:
a line guide having a coiled portion surrounding said tubular member and an integrally formed looped end through which a fishing line is passed, said line guide rotating around said tubular member on said coiled portion; and
a line guide friction mechanism placed in gripping relationship around said tubular member, an elongated clipping portion of said line guide friction mechanism extending over said coiled portion to partially impede rotation of said line guide through friction with said tubular member.

10. The device as set forth in claim 1, wherein said signaling device includes a flag mounted on a flag wire which is coupled to said housing through a spring, said flag wire having a telescoping construction for variable height adjustment.

11. The device as set forth in claim 10, wherein said upwardly extending protrusions further include an elongated raised portion adjoining said hollow spool protrusion, an upper surface of said elongated raised portion including a flag-wire guiding element within which said flag wire is positioned when said signaling device is in said storage position.

12. The device as set forth in claim 11, wherein at least part of said tubular member fits within a generally tubular cavity formed on the underside of said housing by said elongated raised portion when said reel spool assembly is in said retracted position.

13. The device as set forth in claim 1, wherein said tubular member extends through an axial bore in an offset tube portion of a central mounting element, said central mounting element being rotatably coupled to said housing by a fastening element extending through said central mounting element and through corresponding apertures in said frame.

14. The device as set forth in claim 1, wherein said hollow spool protrusion, said handle assembly and said flag securing post are appropriately sized and spaced from one another around a circumference of said housing such that a plurality of said tip-up flag devices stack evenly in a stable manner with one another.

15. The device as set forth in claim 14, wherein tops of said handle assembly and said flag securing post engage an underneath surface of a next adjacent stacked device and said hollow spool protrusion partially nests with a spool cavity of said next adjacent stacked device.

16. The device as set forth in claim 1, wherein said housing is made of molded heavy-weight plastic and does not float in water.

17. The tip-up flag device comprising:
a generally disc-shaped housing having generally flat upper and lower surfaces and a plurality of upwardly extending protrusions on said upper surface including a hollow spool protrusion forming a corresponding spool cavity in said lower surface;
a handle integrally formed with and upwardly extending from said housing upper surface;
a tackle compartment integrally formed with and upwardly extending from said housing upper surface;
a flag securing post integrally formed with and upwardly extending from said housing upper surface;
an upwardly extending signaling device mounted on said housing for movement between an upstanding signaling position, a set position adjacent to and generally parallel with said upper surface, and a storage position also adjacent to and generally parallel with said upper surface;
a retaining and releasing assembly rotatably supported on said housing for releasably retaining said signaling device in said set position; and
a reel spool connected to said retaining and releasing assembly so as to release said signaling device upon rotation of said reel spool, said reel spool having a retracted position in which said reel spool fits within said spool cavity so as not to extend below said lower surface, and an in-use position in which said reel spool is positioned below said upper surface;
said hollow spool protrusion, said handle, said tackle compartment and said flag securing post sized and positioned around a circumference of said housing such that a plurality of said tip-up flag devices stack evenly in a stable manner with a top of said hollow spool protrusion partially nesting within a spool cavity of a next above stacked device.

18. The device as set forth in claim 17, wherein at least one top portion of said handle, said tackle compartment, and said flag securing post engage a lower surface of said next above stacked device when said hollow spool protrusion partially nests within said spool cavity of said next above stacked device.

19. The device as set forth in claim 17, wherein said hollow spool protrusion, said handle and said flag securing post are approximately equidistantly spaced from one another around a circumference of said housing and tops of said handle and said flag securing post engage a lower surface of said next above stacked device.

20. The device as set forth in claim 17, wherein said handle, said tackle compartment, said flag securing post, said signaling device when in said storage position, and said retaining and releasing assembly when in said retracted position, all can be confined within a cylinder defined by said circumference of said housing.

* * * * *